(12) United States Patent
Altiery

(10) Patent No.: US 11,523,619 B1
(45) Date of Patent: Dec. 13, 2022

(54) INCLINED CARVING DEVICE FOR A CARCASS

(71) Applicant: Daniel Altiery, Morris, IL (US)

(72) Inventor: Daniel Altiery, Morris, IL (US)

( * ) Notice: Subject to any disclaimer, the term of this patent is extended or adjusted under 35 U.S.C. 154(b) by 0 days.

(21) Appl. No.: 17/333,708

(22) Filed: May 28, 2021

(51) Int. Cl.
*A22C 21/00* (2006.01)

(52) U.S. Cl.
CPC .................. *A22C 21/0046* (2013.01)

(58) Field of Classification Search
CPC ........... A47B 5/06; A22C 25/06; A22C 25/02; A22C 25/17
USPC ........................................ 452/185, 194–196
See application file for complete search history.

(56) References Cited

U.S. PATENT DOCUMENTS

| | | | | |
|---|---|---|---|---|
| 6,574,924 B2 * | 6/2003 | Maniezzo | ............. | A47F 5/0823 52/36.5 |
| 7,674,163 B2 * | 3/2010 | Howard | ................. | A22C 25/06 452/194 |
| 10,827,761 B1 * | 11/2020 | Graham | .................. | A22C 25/06 |
| 2006/0252359 A1 * | 11/2006 | Helbing | ............... | A22B 5/0005 452/194 |
| 2011/0048288 A1 * | 3/2011 | Sheldon | ................... | B25H 1/04 108/50.18 |

* cited by examiner

*Primary Examiner* — Richard T Price, Jr.
(74) *Attorney, Agent, or Firm* — Donald G. Flaynik

(57) ABSTRACT

An inclined carving device for a carcass includes a mounting board having a plurality of apertures distributed in the mounting board in a predetermined pattern; retaining pins removably inserted into preselected apertures in the mounting board; and a positioning member pivotally secured to the mounting board for disposing the mounting board in an inclined relationship relative to a surface that the carving device is disposed upon; whereby, the retaining pins ultimately secure a carcass to the mounting board when disposed in a substantially horizontal orientation with the positioning member in a closed position; whereupon, the positioning member is pivoted to an inclined or open position relative to the mounting board, thereby enabling a user of the inclined carving device to carve selected portions from the carcass at an angle selected by the user.

20 Claims, 17 Drawing Sheets

INCLINED CARVING DEVICE FOR A CARCASS

BACKGROUND OF THE INVENTION

1. Field of the Invention

The present invention relates to an inclined carving device for a carcass, and more particularly, to a mounting board having a positioning member and retaining pins, screws or bolts for securing a carcass of varying sizes, and in particular a goose carcass, upon the carving board, irrespective of the inclined angle of the mounting board relative to a counter surface that the mounting board is disposed upon.

2. Background of the Prior Art

Hunters clean and carve game birds, including but not limited to ducks, pheasants and geese, relatively soon after the end of the hunting day. Depending on how many hunters there are in a group and how successful the hunting results are for the group, a relatively large quantity of carcasses may have to be cleaned and carved by relatively few hunters in the group. In certain outings, only one member of the group is experienced in cleaning and carving game carcasses.

Prior art carcass carving techniques include one hunter cleaning and cutting multiple carcasses sequentially by disposing each carcass upon a substantially horizontal counter surface, resulting in the hunter experiencing neck and back pains because of constantly bending over each carcass while holding the carcass with one hand and carving the carcass with a knife held in the other hand.

A need exists for a device that supports a carcass in an inclined relationship relative to a counter surface upon which the carcass supporting device is disposed. Further, a need exists for the carcass to be supported by the device in an inclined relationship determined by the user's subjective comfort requirements when carving the carcass.

SUMMARY OF THE INVENTION

It is an object of the present invention to overcome many of the disadvantages associated with prior art carcass devices for assisting a person when holding and carving a carcass. A principal object of the present invention is to position a carcass in an inclined relationship relative to a person carving the carcass. A feature of the device is a mounting board having a positioning member that maintains the mounting board in an inclined relationship relative to a counter surface when a top surface of the board receives a carcass. Another feature of the device is a positioning member having a stabilizing bar assembly that maintains the inclined relationship between the mounting board and the counter surface. An advantage of the device is that the mounting board can be disposed upon a counter surface at an inclined angle selected by the person carving the carcass. Another advantage of the device is that the person using the device can stand adjacent to the counter surface and the inclined mounting board supporting the carcass, whereby, the stance of the person carving the carcass includes the person's neck and back being substantially vertically orientated, thereby reducing the possibility of neck and back pain. Still another advantage of the device is that the inclined relationship between the mounting board and the counter surface is maintained irrespective of the manual force imparted upon the carcass detachably secured to the top surface of the mounting board, thereby enabling the user of said inclined carving device to safely and comfortably carve selected portions of the carcass in a minimum time period.

Another object of the present invention is to detachably secure a carcass to a top surface of a mounting board. A feature of the device is multiple pins that insert through apertures in the mounting board and that are detachably secured to the mounting board via nuts rotationally secured to threaded ends of the pins protruding from a bottom surface of the mounting board. An advantage of the device is that the pins engage and secure a carcass to the top surface of the mounting board without penetrating or otherwise damaging the carcass. Another advantage of the device is that a carcass can be removed from the device and another similarly configured and dimensioned carcass can be inserted within the same pin configuration used to secure the previous carcass within a relatively short time period. Still another advantage of the device is that a carcass can be removed from the device and another similarly configured carcass but with dissimilar dimensions can be inserted within substantially the same pin configuration after repositioning relatively few pins detachably secured to the mounting board.

Still another object of the present invention is to secure a carcass to a top surface of the mounting board by using bolts and/or screws. A feature of the device is threaded apertures through the mounting board. An advantage of the device is that the screws and/or bolts can engage a carcass and can be detachably secured to the mounting board via only the top surface of the mounting board.

Yet another object of the present invention is to provide a carcass securing member that detachably secures to pins, bolts and/or screws and that ultimately engages the carcass when the pin, bolt and/or screw is detachably secured to the mounting board. A feature of the device is a hook member having an aperture for receiving a shank portion of a pin, bolt and/or screw. Another feature of the device is a hook member having a pointed angled end that engages and grasps the carcass. An advantage of the device is that the pin, bolt and/or screw insert through the hook member aperture without rotating the hook member. Another advantage of the device is that the user can maintain engagement between the hook member and carcass as the pins, bolts and/or screws are inserted into the apertures in the mounting board, thereby forcibly engaging the hook members upon the carcass, and forcibly urging the carcass upon the top surface of the mounting board. Yet another advantage of the device is that the pointed angled end of the hook member penetrates the carcass as the pins, bolts and/or screws are forced into the mounting board, thereby increasing the grasp of the hook member upon the carcass.

BRIEF DESCRIPTION OF THE DRAWINGS

The foregoing invention and its advantages may be readily appreciated from the following detailed description of the preferred embodiment, when read in conjunction with the accompanying drawings in which.

DESCRIPTION OF THE PREFERRED EMBODIMENT

Figure 16:
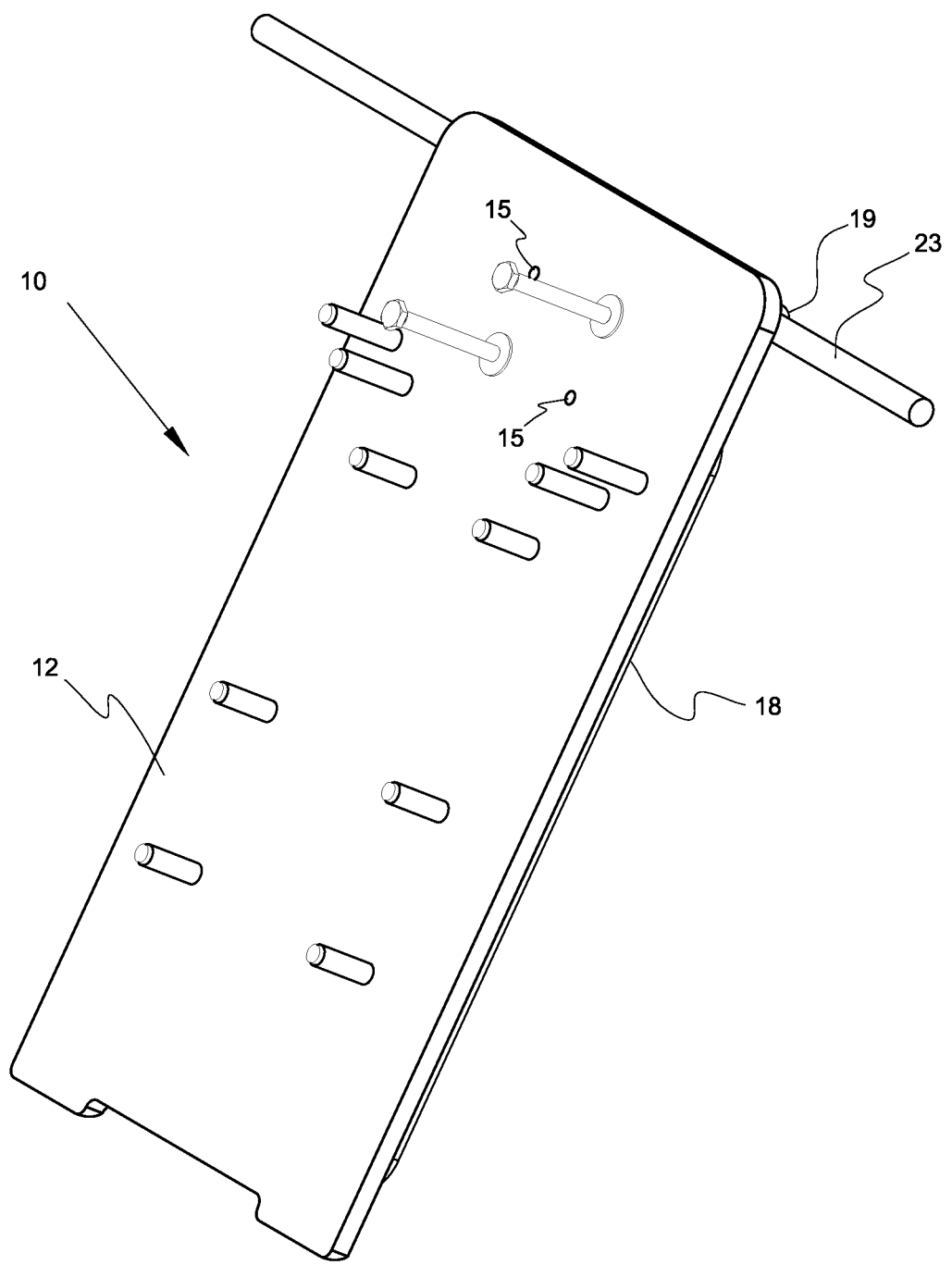
FIG. 16 is the device of FIG. 3, but with the device hanging from a support line via hanging hooks, and the positioning member in a closed position in accordance with the present invention.

Referring to FIGS. 1-6, an inclined carving device is denoted as numeral 10. The device 10 includes a mounting board 12 having a matrix of hexagonally and/or cylindrically configured apertures 14 (FIGS. 1 and 2), and at least two relatively larger cylindrically configured apertures 15 disposed proximate to a top end 13 of the mounting board 12 in a predetermined pattern. The device 10 further includes hexagonally or cylindrically configured metal retaining pins 16 removably and snugly inserted into respective hexagonal or cylindrical apertures 14 in the mounting board 12; cylindrically configured retaining pins 17 removably and snugly inserted into the apertures 15; hanging hooks 19 detachably secured to the top end 13 of the mounting board 12 for vertically storing, cleaning or supporting the carving device 10 via a line 23 fabricated from wire or rope (FIG. 16); and a positioning member 18 is pivotally secured to the mounting board 12 for disposing the mounting board 12 in varying inclined and locked positions relative to a counter surface (not depicted) the carving device 10 is disposed upon. A matrix of hexagon or cylindrical apertures 14 and 15 can be included in the mounting board 12 (FIG. 1), thereby enabling the same mounting board 12 to be used for carcasses 20 varying in size from ducks to geese by selecting apertures 14 and 15 for receiving respective retaining pins 16 and 17 adjacent to corresponding peripheral portions of the duck or goose carcass 20 (see FIGS. 5, 17 and 18). The retaining pins 16 and 17 are well known by those of ordinary skill in the art and include quick release pins, bolt and nut pins, and screws sold by "Monroe," "Amazon" and "Jergens" on the internet. Preferred retaining pins 16 and 17 include a binding barrel 16a and screw 16b (see FIG. 6) combination manufactured by McMaster Car and are sold on the internet. An advantage of hexagonally configured barrels 16a over cylindrically configured barrels 16a disposed in selected hexagonally configured apertures 14 in the mounting board 12, is that the hexagonally configured barrels 16a will not rotate when the screw 16b is rotationally inserted into or extracted from the barrel 16a, thereby enabling the user to manually rotate the screw 16b without manually preventing the barrel 16a from rotating. The binding barrels 16a include shank portions 21 that snugly insert through cooperating relatively rigid polymer sleeve members 25 before the barrels 16a are inserted into cooperating apertures 14.

Figure 5:
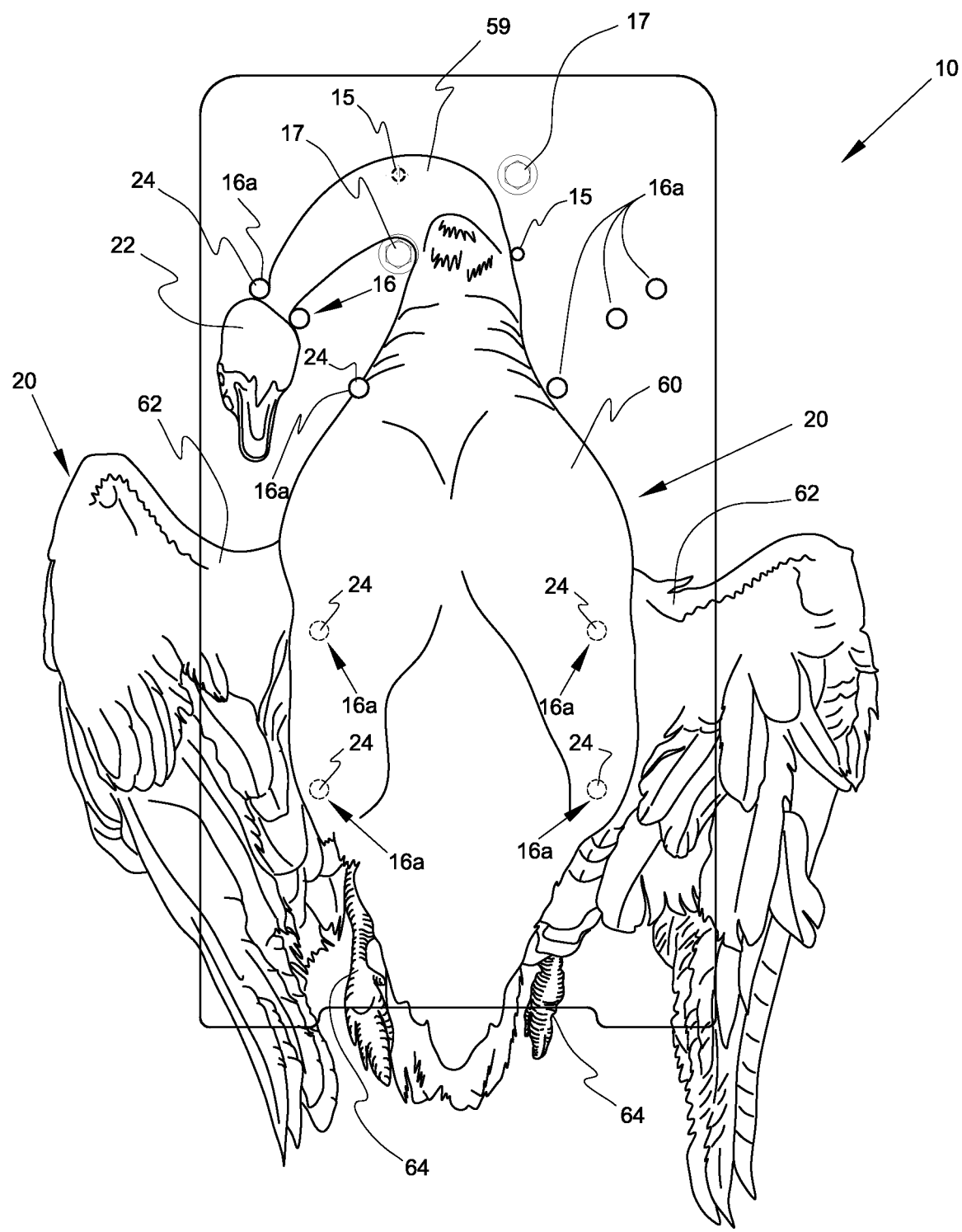
FIG. 5 is the front view of device of FIG. 3, but with a goose carcass secured to a mounting board via retaining pins in accordance with the present invention.
Figure 6:
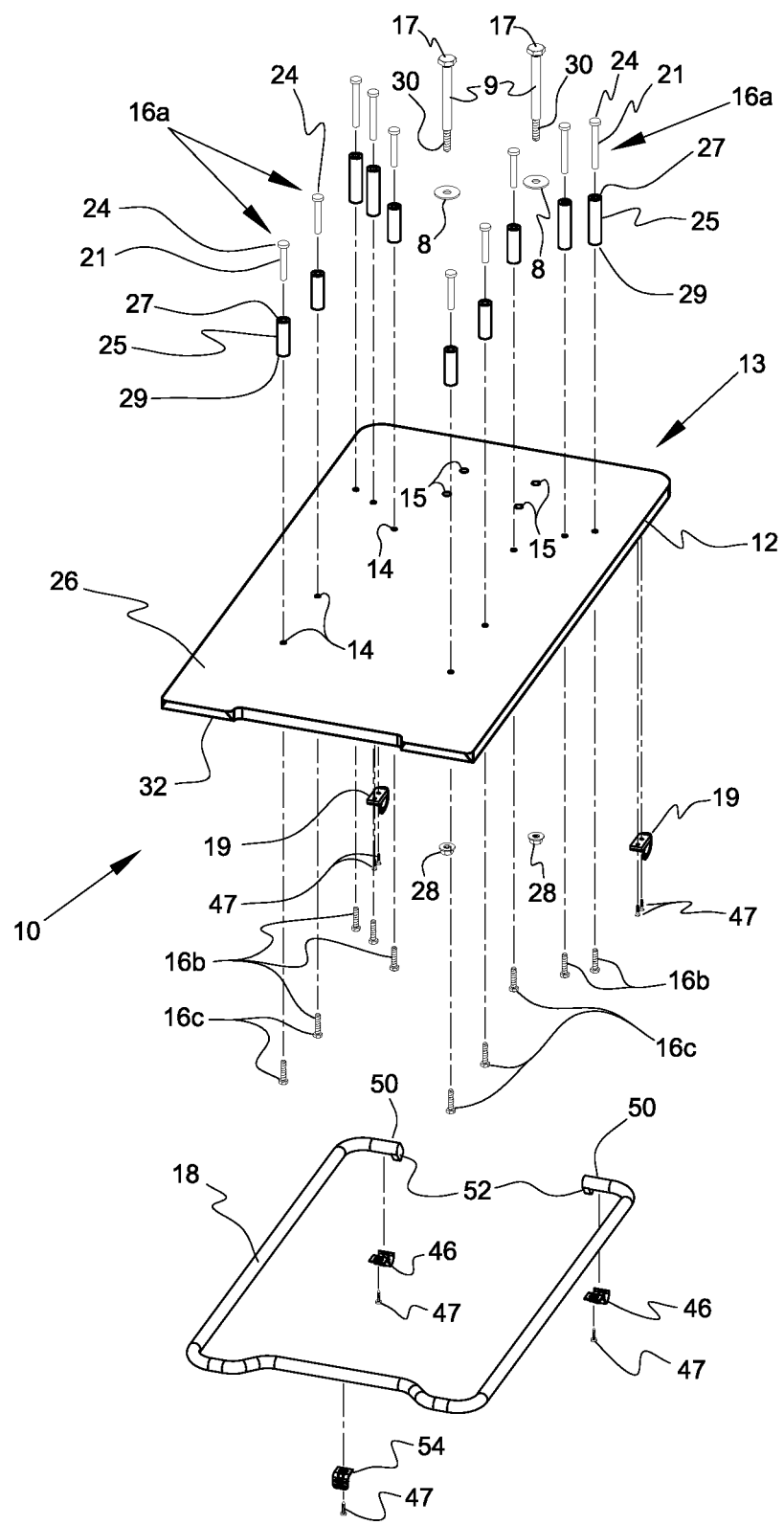
FIG. 6 is an exploded view of the device of FIG. 3.
Figure 7:
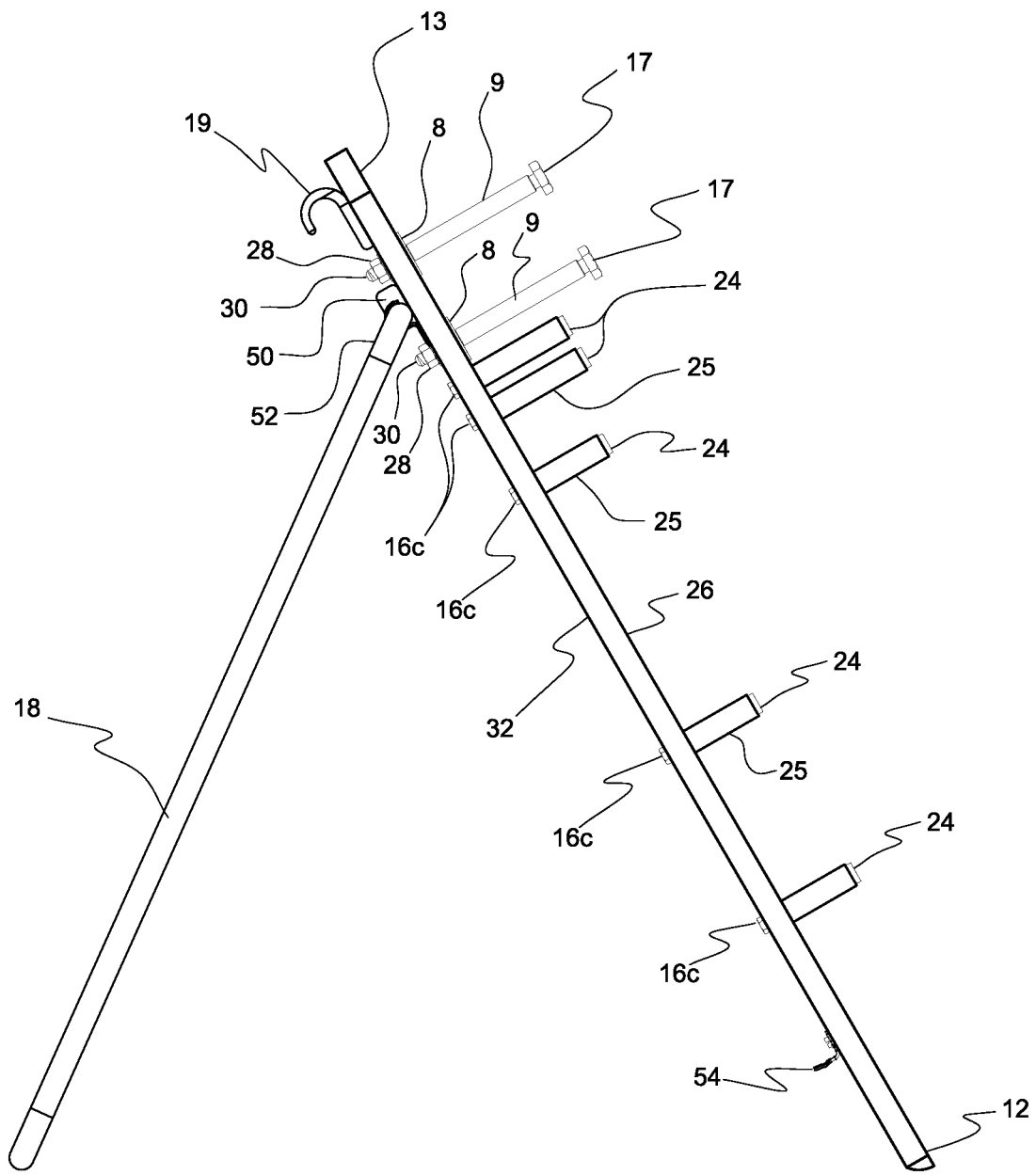
FIG. 7 is a side view of the device of FIG. 3 with a positioning member in an open position in accordance with the present invention.
Figure 8:
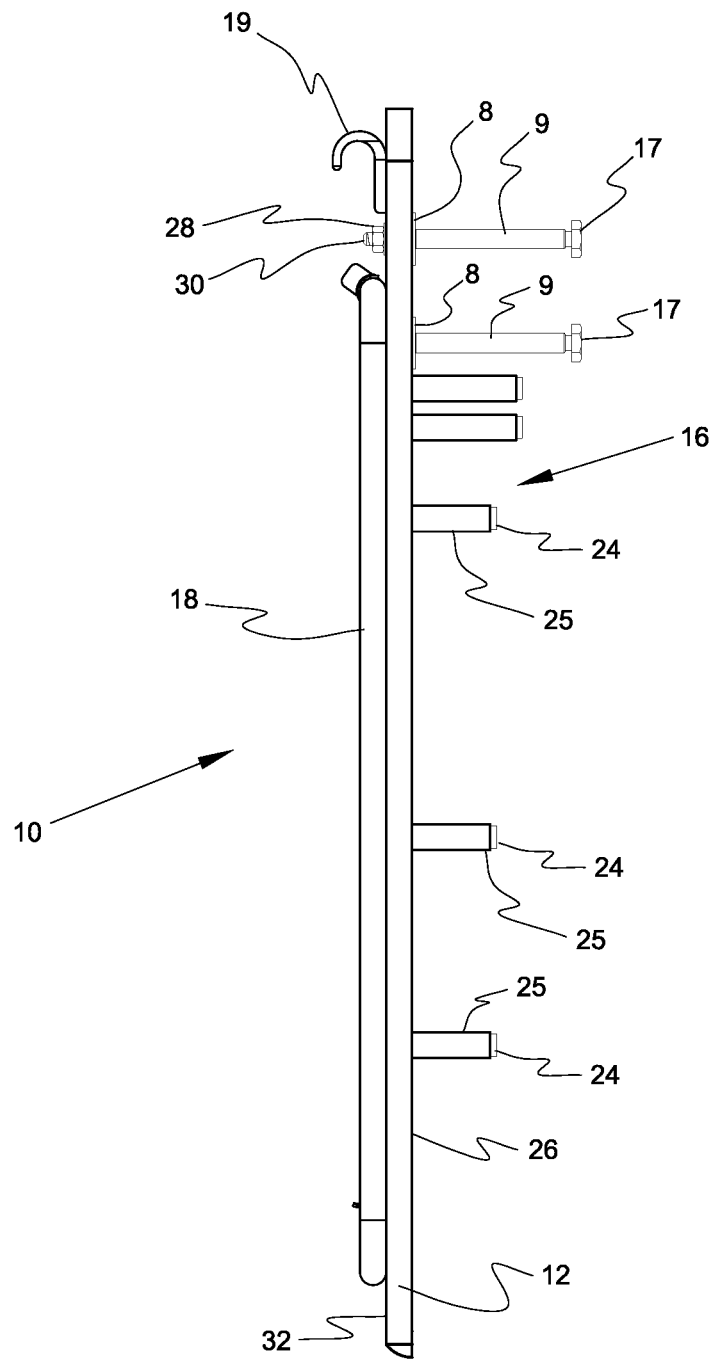
FIG. 8 is the side view of the device of FIG. 7, but with the positioning member in a closed position in accordance with the present invention.
Figure 9:
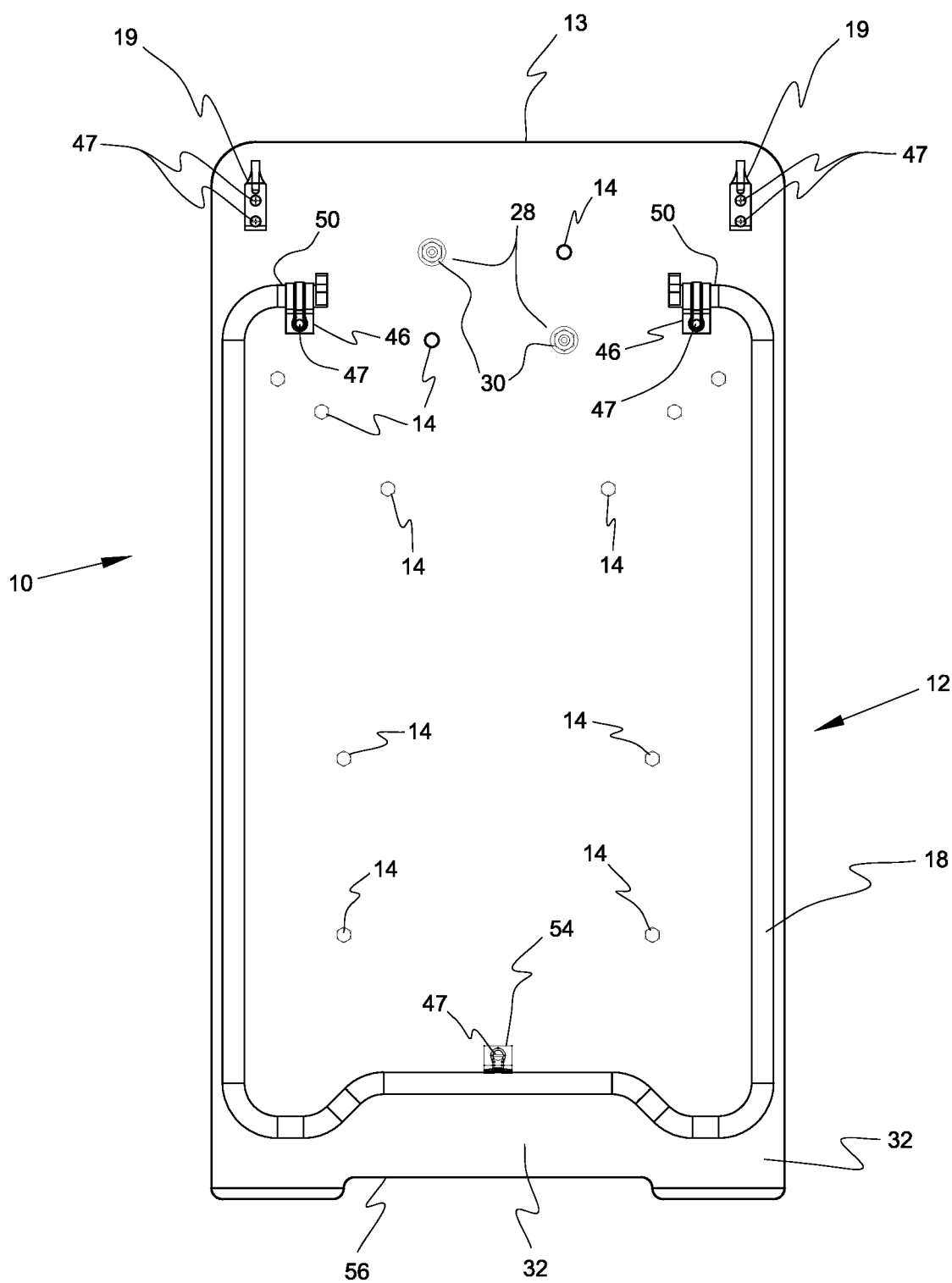
FIG. 9 is a back view of the device of FIG. 8.

Referring to FIGS. 5 and 6, the cylindrically configured retaining pins 17 disposed in the threaded cylindrically configured apertures 15 allow the pins 17 to rotate when engaging a neck portion 59 of the carcass 20 until a head portion 22 of the carcass 20 is secured between two retaining pins 16; whereupon, the pins 17 are locked in position via retainer nuts 28, resulting in the neck portion 59 of the carcass 20 being secured proximate to the top end 13 of the mounting board 12. The cylindrical retaining pins 17 include a shank portion 9 having a diameter slightly larger than the receiving apertures 15, and a threaded portion 30 having a diameter slightly smaller than the apertures 15, thereby allowing the threaded portion 30 to insert through the mounting board 12 until the shank portion 9 engages the top surface 26 of the board 12. A washer 8 can be disposed between the shank portion 9 and the top surface 26 to prevent a rotating shank portion 9 from gouging or otherwise damaging the top surface 26 when the retainer nuts 28 are rotationally disposed upon the threaded portion until the shank portion 9 forcibly engages the washer 8 and the retainer nut 28 forcibly and rotationally engages the bottom surface 32 of the mounting board 12. When the carcass 20 is secured to the mounting board 12, a user of the carving device 10 is able to dispose the mounting board 12 and the carcass 20 secured to the mounting board 12 in an inclined position upon a counter surface via the pivoting positioning member 18. The inclined position is predetermined by the user (infra) for promoting safety and minimizing the time required to carve selected portions of the carcass 20.

The mounting board 12 can be fabricated from a myriad of materials including but not limited to plywood, carbon steel, stainless steel, polymers and aluminum. The apertures 14 and 15 are relatively small and can vary from one-quarter to one-half an inch in diameter for a cylindrical aperture, and the same dimensions for separating opposing sides of a hexagonal aperture, depending on the dimensions of the surface area of the mounting board 12 and the corresponding dimensions of the carcass 20 secured to the mounting board 12. The apertures 14 and 15 extend completely through the mounting board 12, thereby promoting the cleaning and disinfecting of the mounting board 12 after the carcass 20 has been removed from the mounting board 12.

The shank portions 21 of the binding barrels 16a ultimately extend through the sleeve members 25 and through the apertures 14 until head portions 24 of the barrels 16a engage top edges 27 of the sleeve members 25, and bottom edges 29 of the sleeve members 25 engage the top surface 26 of the mounting board 12. The screws 16b are rotationally secured to binding barrels 16a exposed after the shank portions 21 have extended through the apertures 14, whereby, head portions 16c of the screws 16b engage a bottom surface 32 of the mounting board 12, and the sleeve members 25 are perpendicularly secured upon the top planar surface 26 of the mounting board 12, thereby maintaining a predetermined separation distance of the head portions 24 of the retainer pins 16 from the top planar surface 26, and maintaining the position of the carcass 20 upon the mounting board 12 irrespective of the inclined position of the mounting board 12.

The retaining pins 16 and 17 engage and secure a carcass 20 to the top surface 26 of the mounting board 12 without penetrating or otherwise damaging the carcass 20 via a relatively large quantity of the retaining pins 16 and 17 engaging the carcass 20, thereby preventing the carcass 20 from sliding upon the top surface 26 when a user forcibly carves the carcass 20. Further, the retaining pins 16 and 17 allow a carcass 20 to be removed from the device 10 and another similarly configured and dimensioned carcass 20 to be inserted within the same pin configuration used to secure the previous carcass 20 to the top surface of the mounting board 12. The carcass 20 substitution takes place in a relatively short time period. The retaining pins 16 and 17 can also promote a carcass 20 substitution with a similarly configured carcass 20 having dissimilar dimensions by repositioning selected retaining pins 16 and 17 that will snugly engage the dissimilarly dimensioned carcass 20, whereby the dissimilarly dimensioned carcass 20 is removably secured to the top surface 26 of the mounting board 12 and ready for carving. The acute angle formed between the mounting board 12 and the counter surface via the pivoting positioning member 18 is limited to a range that maintains the carcass 20 upon the top surface 26 of the mounting board 12 when using retaining pins 16 and 17 that engage without penetrating corresponding portions of the carcass 20.

Referring to FIGS. 6-11, the pivoting positioning member 18 is manufactured from aluminum or stainless steel and is rotationally secured to the mounting board 12 via retainer members 46 secured to bottom surface 32 of the mounting board via relatively small screws 47. Each retainer member 46 includes an aperture 48 for receiving a respective end portion 50 of the positioning member 18. Each end portion 50 includes an integral retainer protrusion 52 that restricts extraction of the end portions 50 from the retainer members 46 until sufficient manual force is applied upon the end portions 50 in a direction opposite to the insertion direction of the end portions 50 into a respective retainer member 46. The retainer protrusions 52 also prevent the positioning member 18 from pivoting past a predetermined angle relative to the mounting board 12, resulting in a relatively fast "set-up" of the device 10 upon the counter surface. When the inclined carving device is placed in storage, the pivoting member 18 is manually urged to a "closed" position, whereby, the pivoting member 18 engages the bottom surface 32 of the mounting board 12. The closed position of the pivoting member 18 is maintained via a retainer clip 54 (well known to those of ordinary skill in the art) secured upon the bottom surface 32 of the mounting board 12 proximate to a bottom end 56 of the mounting board 12. The pivoting member 18 is manually urged into the retainer clip 54, and manually separated from the retainer clip 54 when the inclined carving device is disposed to receive a carcass 20.

Figure 10:
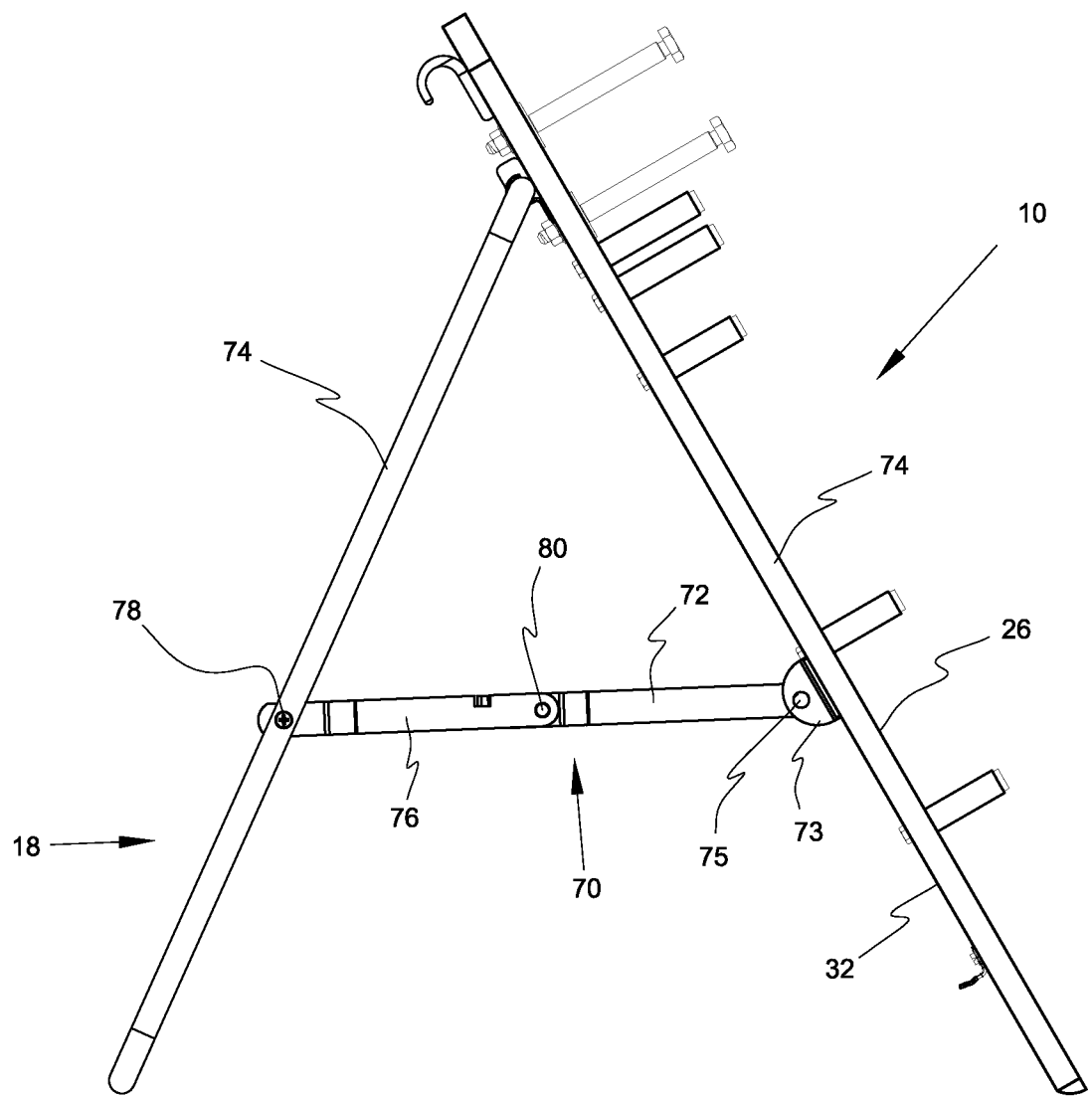
FIG. 10 is a side view of the device of FIG. 7, but with a stabilizing bar assembly secured to the mounting board and the positioning member in an open position.
Figure 11:
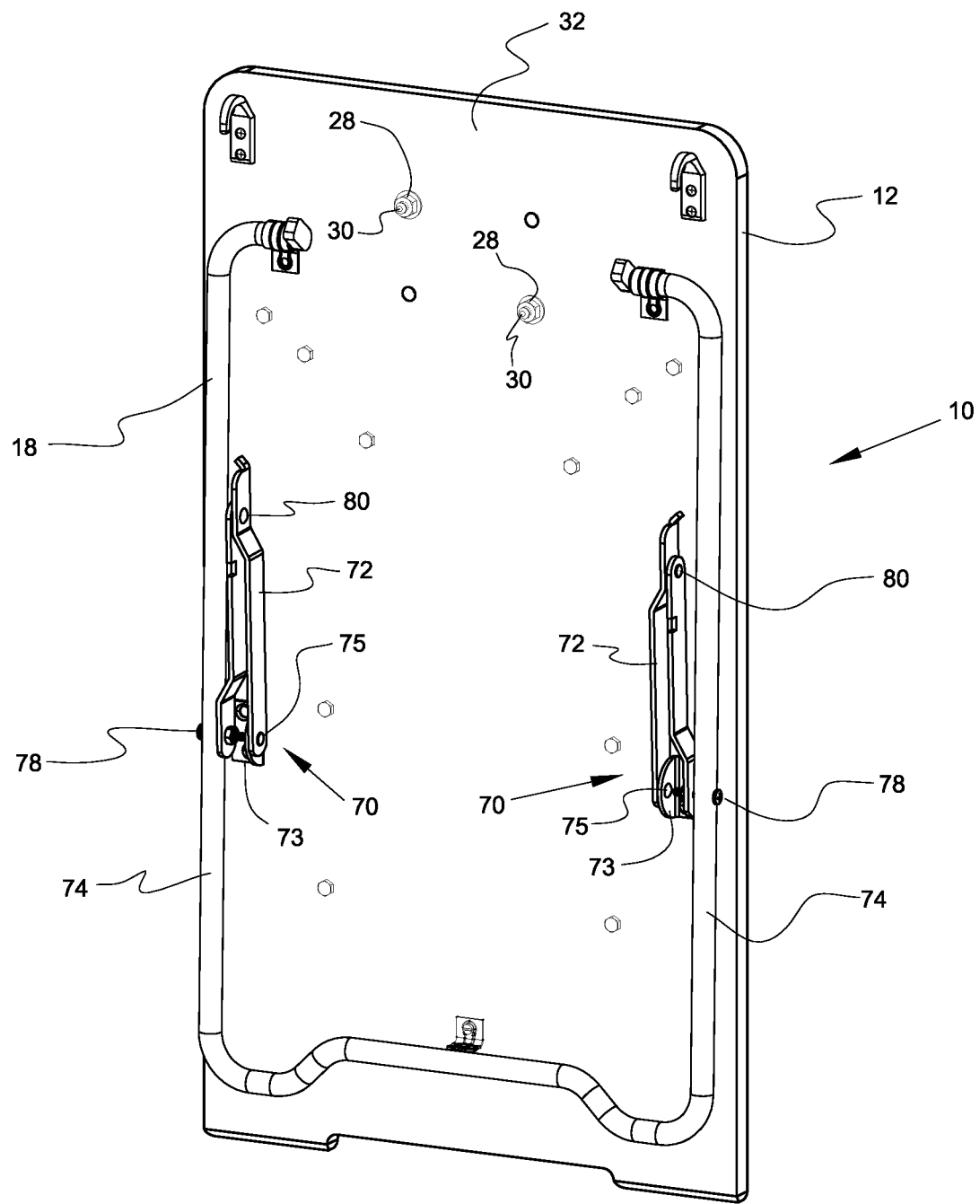
FIG. 11 is the back view of the device of FIG. 10, but with the positioning member disposed in a closed position in accordance with the present invention.
Figure 12:
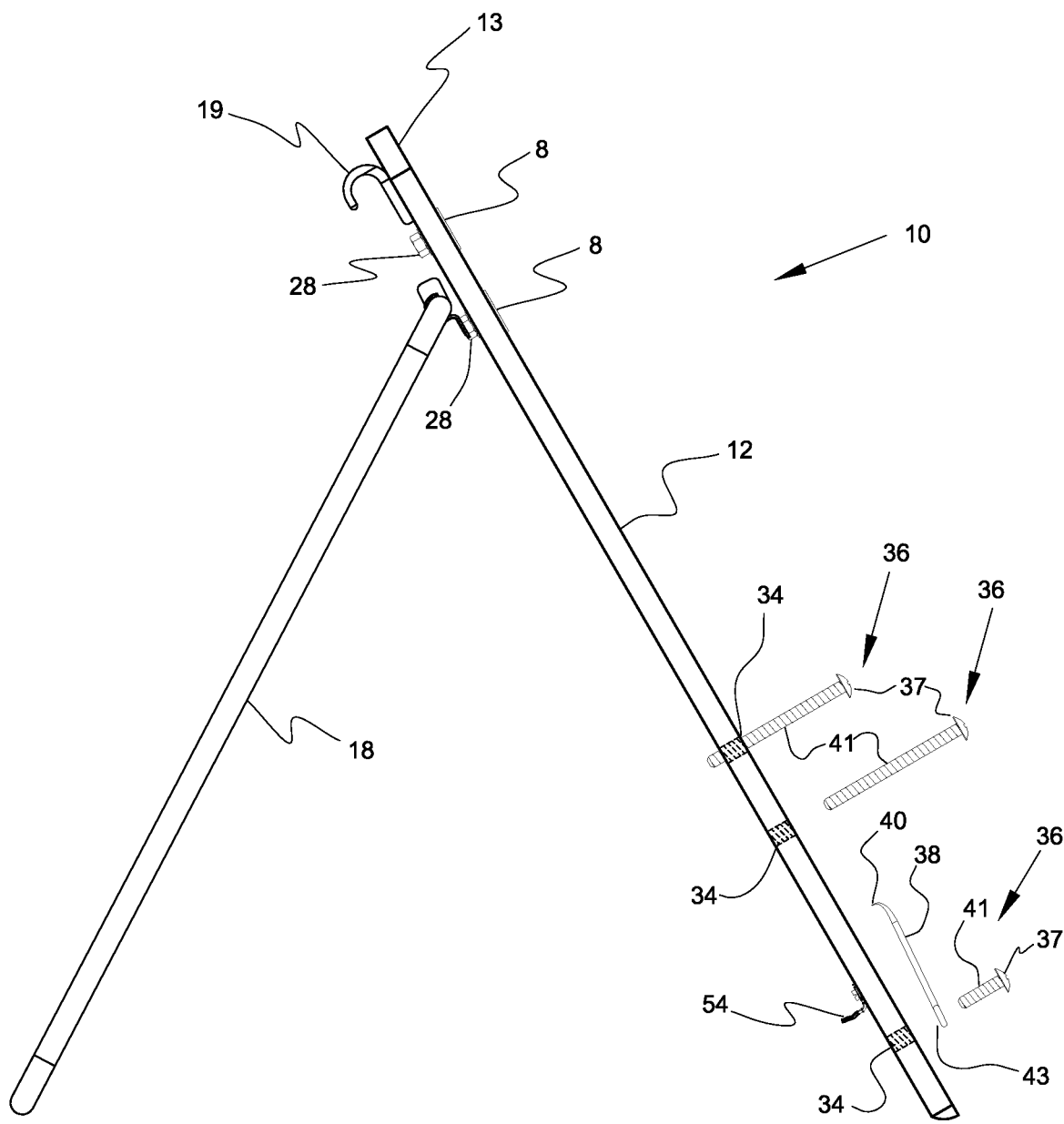
FIG. 12 is the side view of the device of FIG. 7, but with threaded bolts and a hook member separated from the mounting board and replacing retaining pins in accordance with the present invention.
Figure 13:
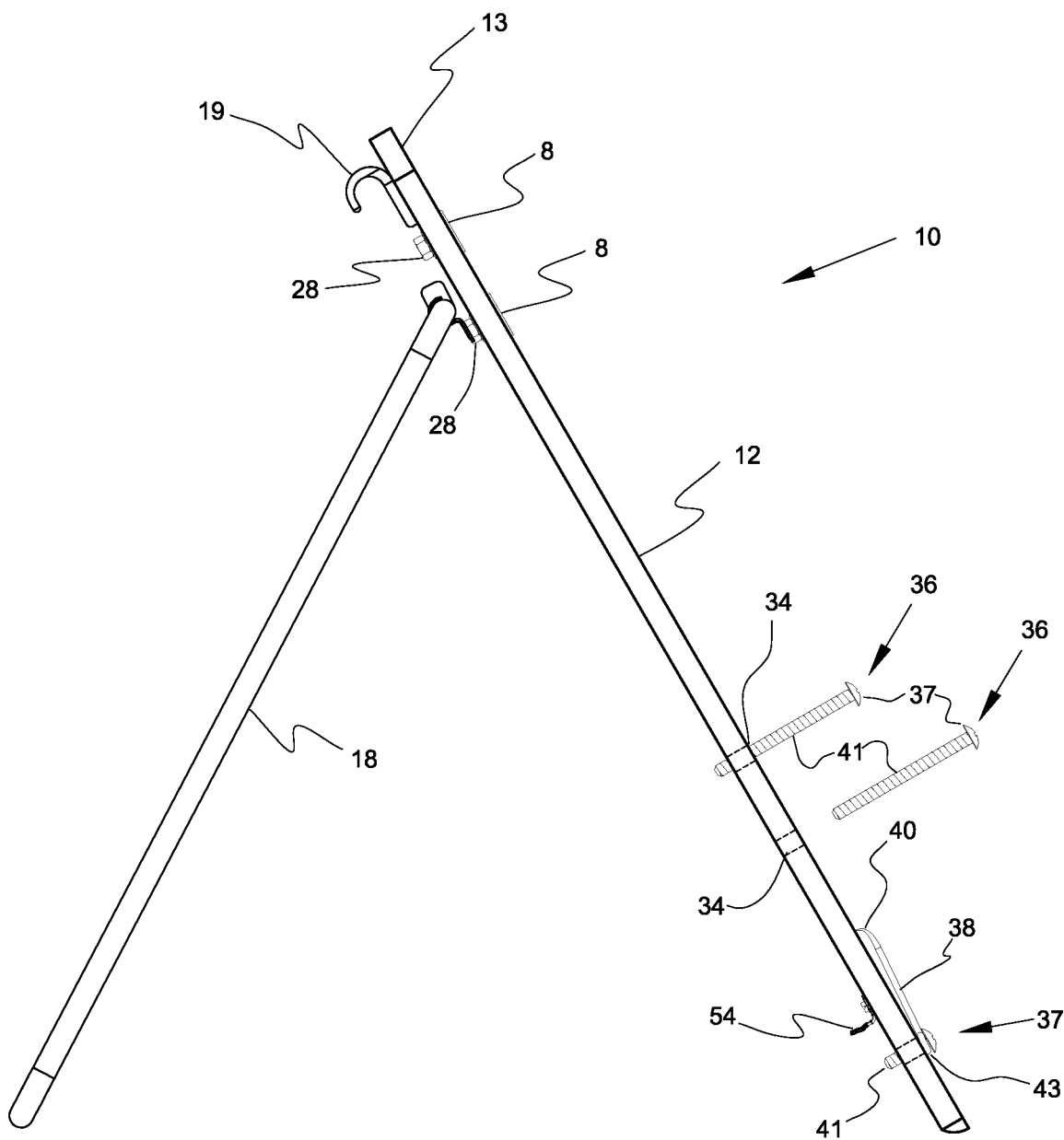
FIG. 13 is the side view of the device of FIG. 12, but with the hook member secured upon the mounting board in accordance with the present invention.
Figure 14:
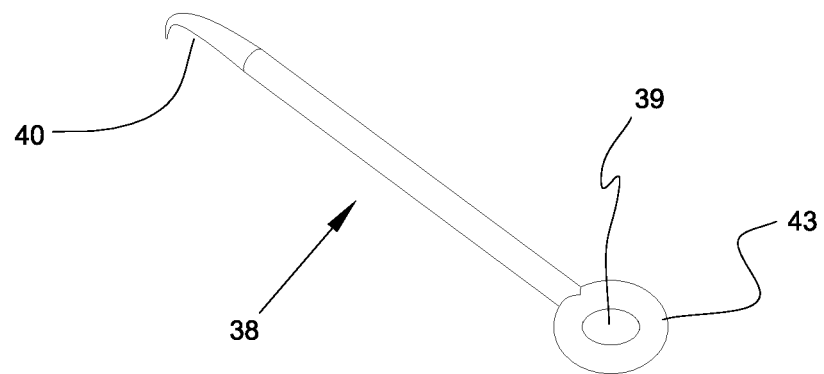
FIG. 14 is a perspective view of the hook member of FIG. 12 in accordance with the present invention.
Figure 15:
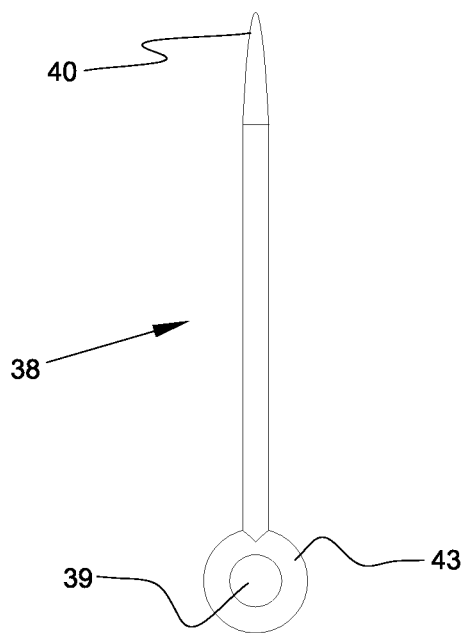
FIG. 15 is a top view of the hook member of FIG. 14.

Referring to FIGS. 10 and 11, the pivoting positioning member 18 is depicted with a pair of stabilizing bar assemblies 70 for preventing the positioning member 18 from pivoting past the predetermined angle determined by the retainer protrusions 52 when a manual force is imparted upon the device 10 that would collapse the device 10, whereby, the positioning member 18 and mounting board 12 would form a substantially 180-degree angle. Each stabilizing bar assembly 70 is joined to a respective leg 74 of the positioning member 18 and a cooperating side portion of the bottom surface 32 of the mounting board 12. Each stabilizing bar assembly 70 includes an inner bar 72 pivotally joined, via a bolt and nut combination 75, to a bracket 73 that is secured to the bottom surface 32 via multiple screws (not depicted) rotationally and partially inserted into cooperating threaded apertures (not depicted) in the mounting board 12 at a proximate mid-portion of a respective side of the bottom surface 32; whereby, the screws secure the bracket 73 to the mounting board 12 without penetrating the top surface 26 of the mounting board 12 to avoid contact with the carcass 20 and user's hand. The advantage of the stabilizing bar assemblies 70 is that the inclined relationship between the mounting board 12 and the counter surface is maintained irrespective of the manual force imparted upon the carcass 20 detachably secured to the top surface 26 of the mounting board 12.

Each stabilizing bar assembly 70 further includes an outer bar 76 pivotally joined, via a bolt and nut combination 78, to a proximate mid-portion of a respective leg 74 of the positioning member 18; the outer bar 76 also being pivotally joined, via a bolt and nut combination 80, to a respective end of the inner bar 72. The inner and outer bars 72 and 76 cooperate to enable the legs 74 of the positioning member 18 to separate or "open" from the bottom surface 32 of the mounting board 12 a predetermined distance that corresponds to an angle of inclination of the mounting board 12 upon a counter surface selected by the user for promoting the manual carving of the carcass 20 upon the mounting board 12. The user can adjust the angle of inclination by adjusting the lengths of the inner and outer bars 72 and 76, and/or relocating the brackets 73 and bolt and nut combinations 78 upon respective alternative positions of the bottom surface 32 and positioning member leg 74. The user's ability to adjust the angle of inclination of the mounting board 12 upon the counter surface enables the user to experiment with positioning the carcass 20 at varying angles to determine at which carcass angle 20 the user is most comfortable carving the carcass 20.

Referring to FIGS. 12-15, alternatives members to the hexagonal and cylindrical apertures 14 and 15, and the cooperating retainer pins 16 and 17 are depicted. The alternative members include threaded cylindrical apertures 34 that rotationally receive cooperating screws or bolts 36 that rotationally insert into the apertures 34 until head portions 37 of the screws or bolts 36 engage a portion of the carcass 20, thereby preventing the carcass 20 from being elevated above the top planar surface 26 of the mounting board 12 and preventing a knife from cutting the user, irrespective of the mounting board 12 being disposed in a horizontal or inclined position.

Irrespective of retaining pins 16 and 17, or bolts 36 being used to maintain the position of the carcass 20 upon the mounting board 12, to increase the "grasp" of the pins 16 and 17, or screws or bolts 36 upon the carcass 20, hook members 38 are detachably secured to the pins 16 and 17, or the bolts 36 via an aperture 39 dimensioned to receive a shank portion 41 of the pin 16 and 17, or the bolt 36. A peripheral portion 43 of the hook member 38 forming the aperture 39 is dimensioned to engage the head portions of the retaining pins 16 and 17, and bolts 36 as the hook members 38 are forcibly inserted int the carcass 20. The hook members 38 are manually held upon the carcass 20 when the pins 16 and 17, or screws 36 are manually urged into cooperating apertures 14, 15 and 34, until forcibly urging the carcass 20 upon the mounting board 12. The hook members 38 include an angled, pointed engagement end 40 for penetrating the carcass 20 as the pins 16 and 17, or screws 36 are forcibly urged into corresponding apertures, thereby increasing the grasp of the hook members 38 upon the carcass 20 when maintaining the carcass 20 upon the mounting board 12 as the position of the mounting board 12 approaches a vertical orientation. The hook members 38 are capable of maintaining a carcass 20 upon the top surface 26 of a vertically disposed mounting board 12 in the event that the user requires the carcass 20 to be vertically disposed. The hook members 38 are well known to those of ordinary skill in the art and are sold by "Grainger" and "Amazon" on the internet.

In operation, the inclined carving device 10 is dimensioned and configured to receive a selected carcass 20 for carving. The device 10 includes a mounting board 12 having a matrix of apertures 14 and 15 drilled or punched through the mounting board 12, whereby the apertures 14 and 15 are dimensioned to receive retaining pins 16 and 17, or screws 36 capable of maintain the selected carcass 20 upon the top surface 26 of the mounting board 12. Hanging hooks 19 are detachably secured to the top end 13 of the mounting board 12 for vertically storing or cleaning the carving device 10; and a positioning member 18 is pivotally secured to the top end 13 of the mounting board 12 for disposing the mounting board 12 in varying inclined positions relative to a counter surface (not depicted) the carving device 10 is disposed upon.

Figure 1:
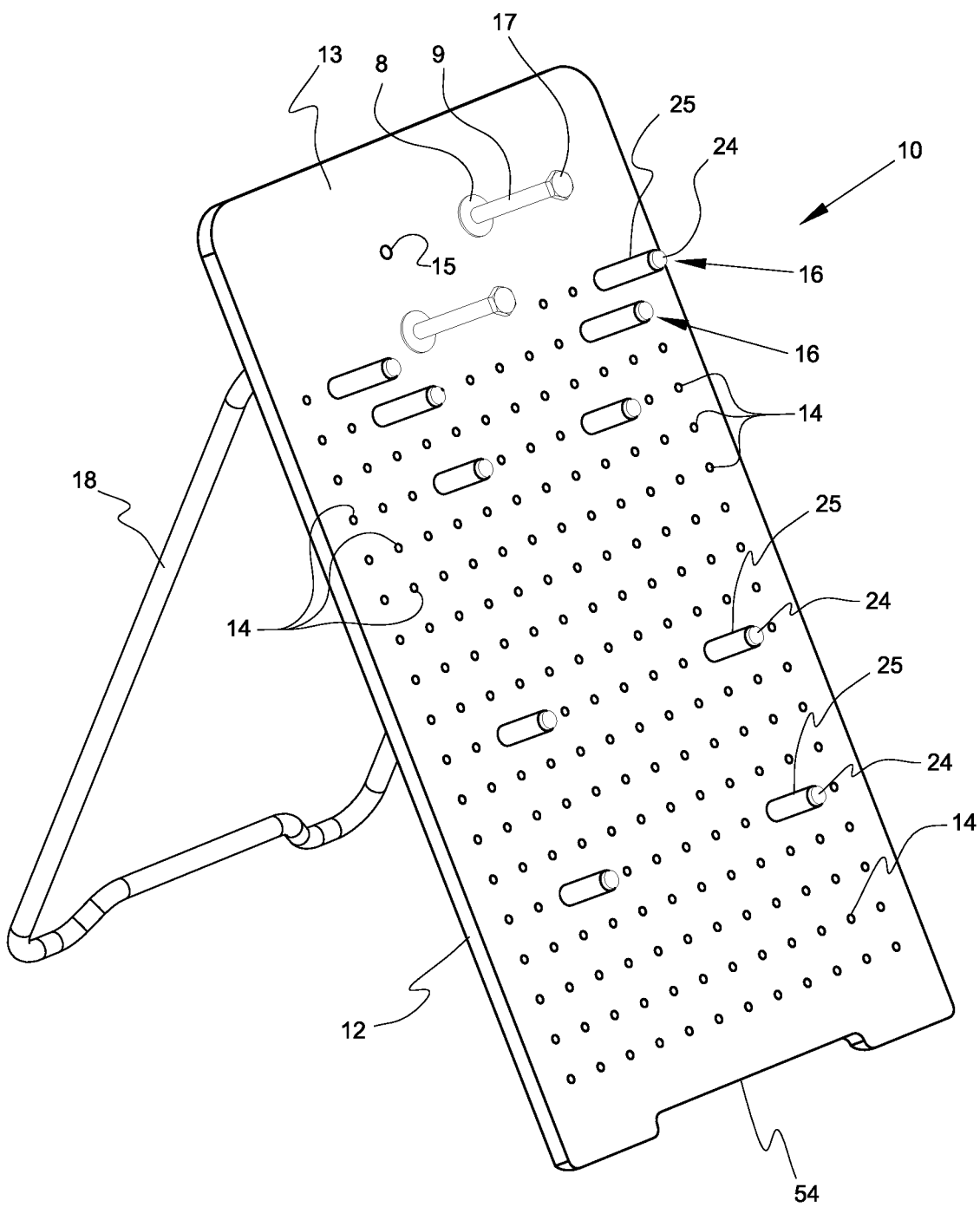
FIG. 1 is a perspective front view of an inclined carving device for a carcass in accordance with the present invention.
Figure 2:
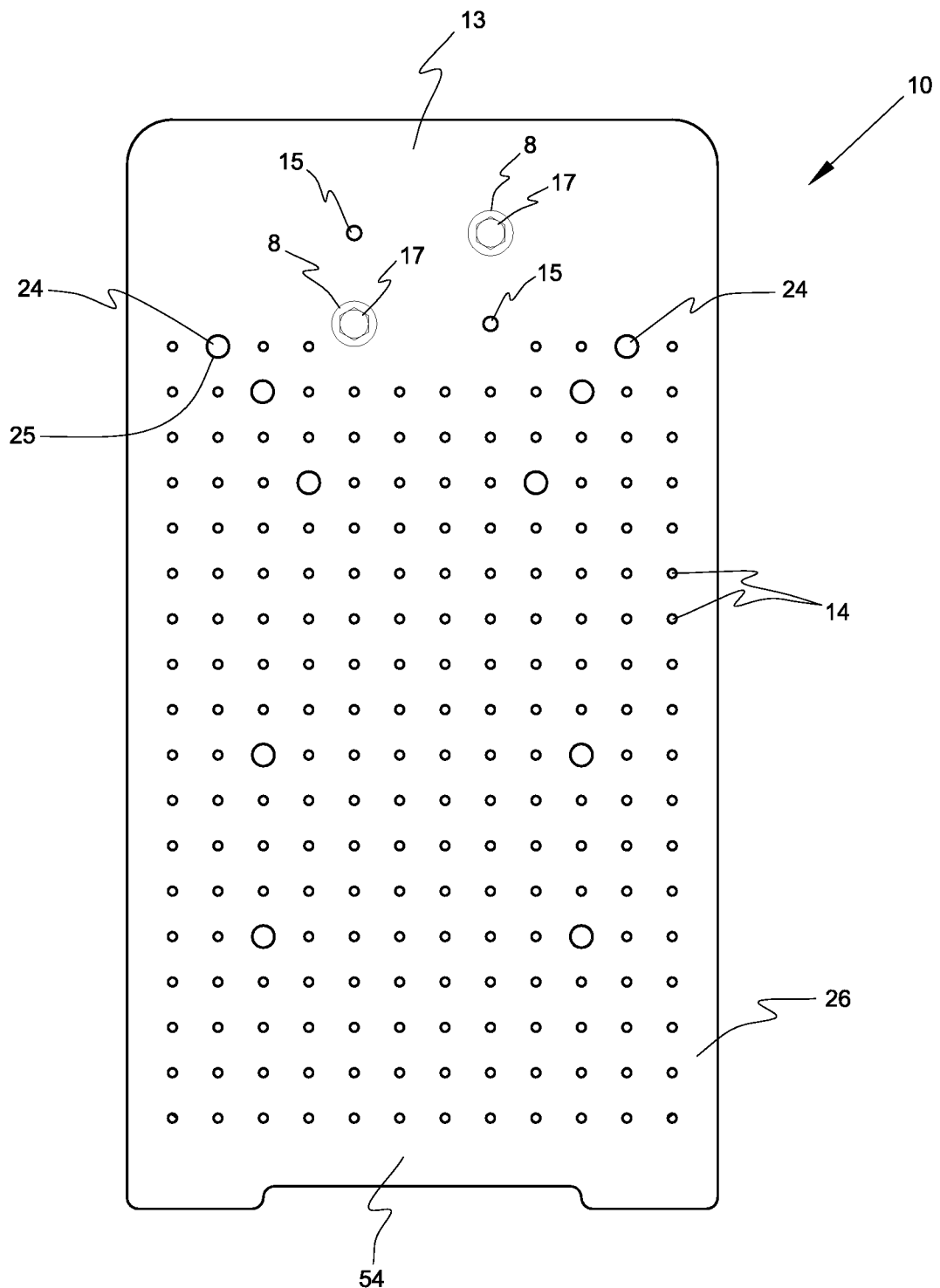
FIG. 2 is a front view of the device of FIG. 1.
Figure 3:
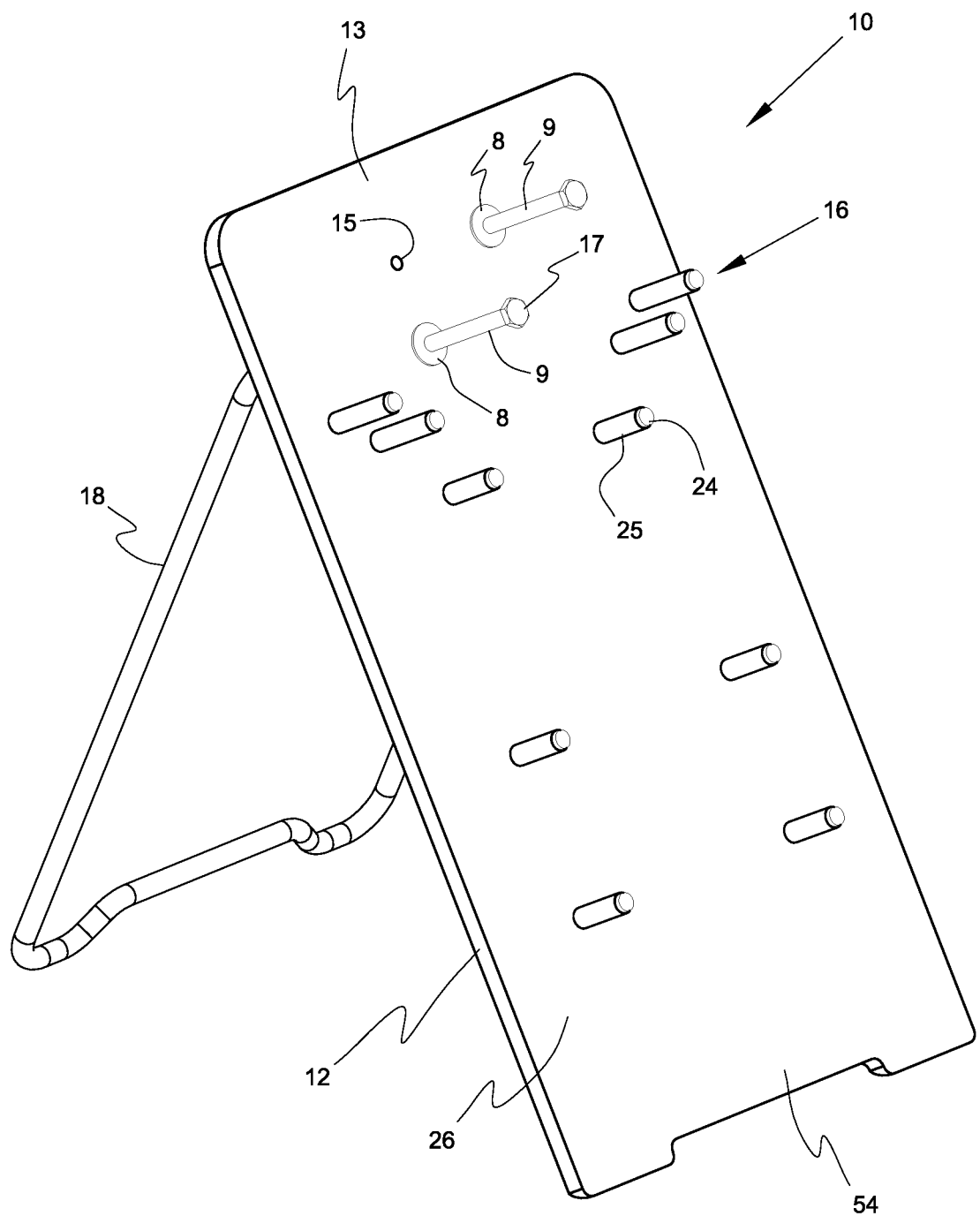
FIG. 3 is the perspective front view of the device of FIG. 1, but without a matrix of apertures.
Figure 4:
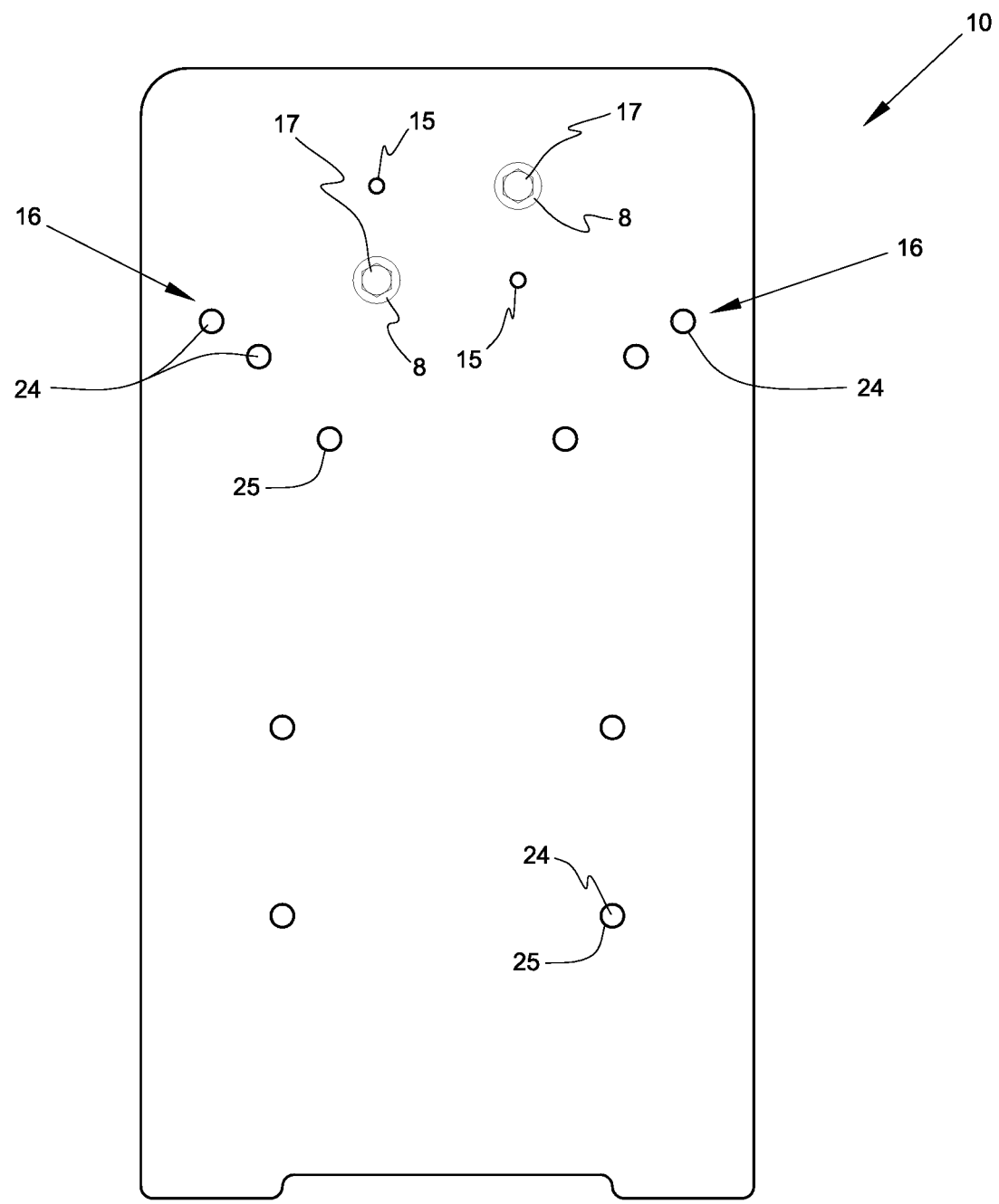
FIG. 4 is a front view of the device of FIG. 3.

The inclined carving device 10 is disposed upon a substantially horizontal surface, whereupon a carcass 20 is positioned on the top surface 26 of the mounting board 12, whereby, the carcass 20 is surrounded by multiple apertures 14 and 15 vertically aligned with peripheral portions of the carcass 20, when taking a top view of the device 10 with the carcass 20 disposed upon the mounting board 12 (illustrated by combining FIGS. 2 and 5 of the device 10 disposed in a horizontal position). Retaining pins 16 and 17 are inserted into a plurality of apertures 14 and 15, whereby, the pins 16 and 17 engage peripheral portions of the carcass 20 sufficient to maintain the carcass 20 upon the mounting board 12 when disposed in an inclined relationship (via the positioning member 18) relative to the horizontal surface the device 10 is disposed upon.

Figure 17:
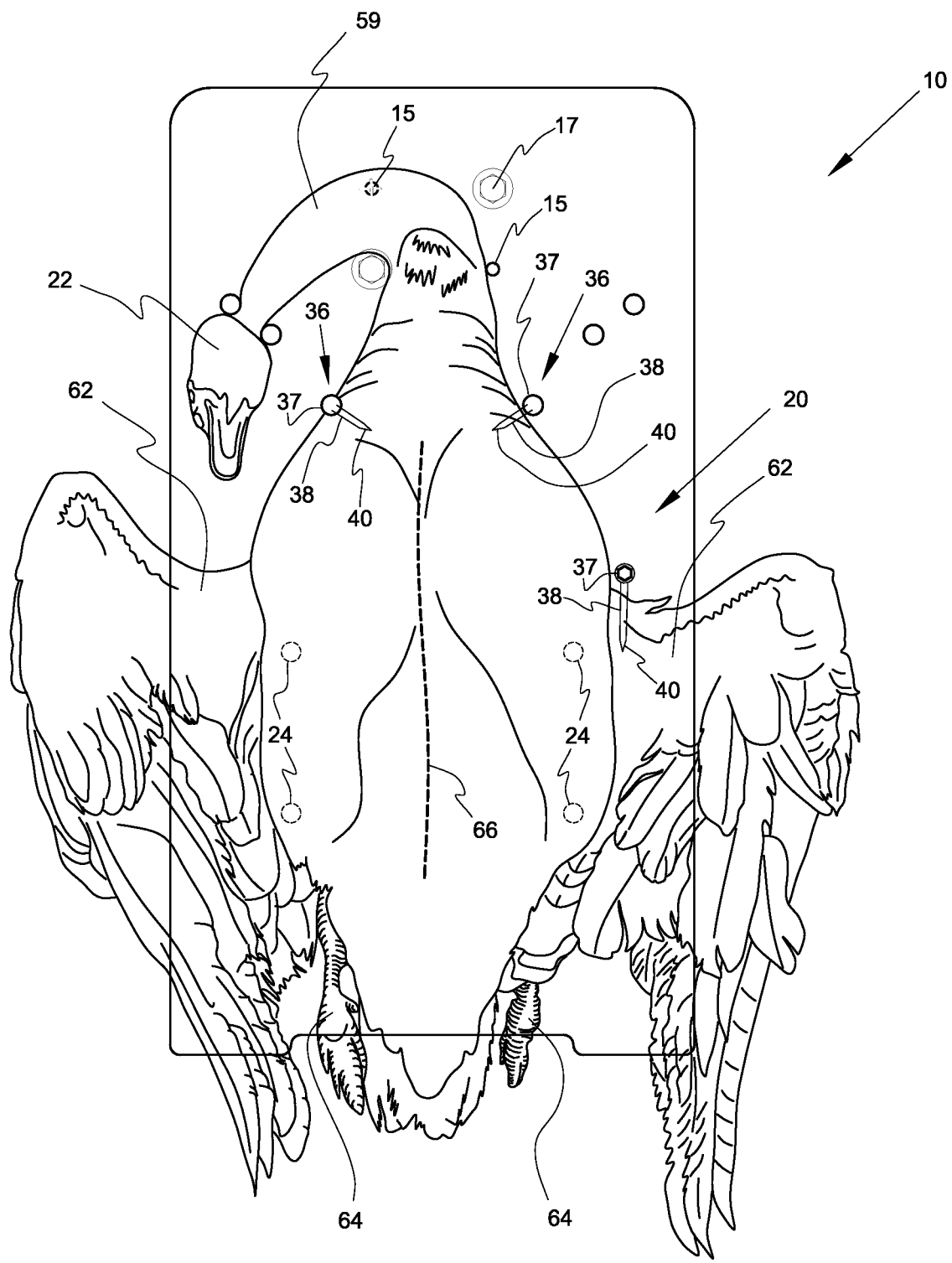
FIG. 17 is the device and carcass of FIG. 5, but with a line cut adjacent to each side of the breast bone of the carcass in accordance with the present invention.
Figure 18:
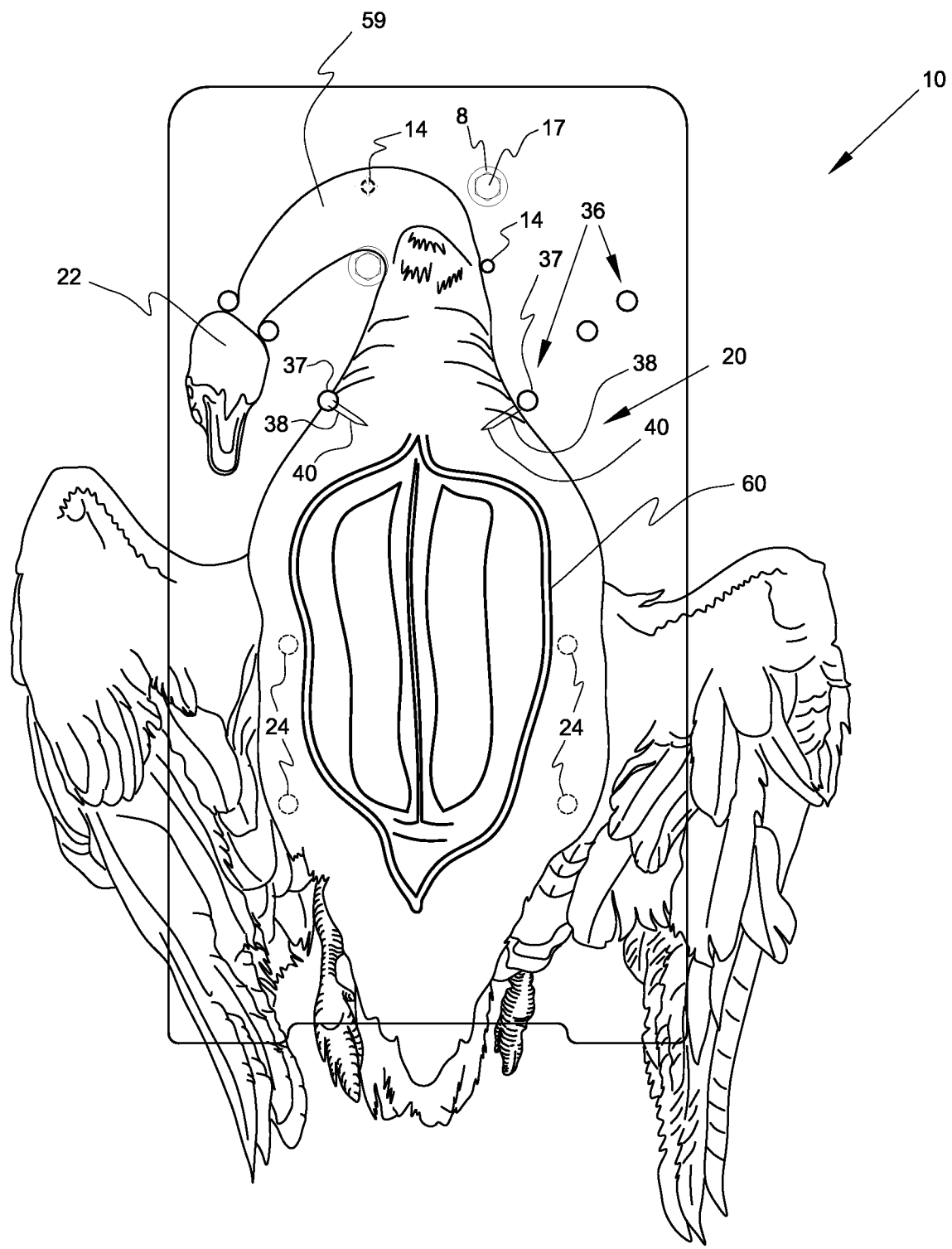
FIG. 18 is the device and carcass of FIG. 5, but with the breast of the carcass removed in accordance with the present invention.

Referring to FIGS. 5, 17 and 18, the carcass 20 is disposed upon the top surface of the mounting board 12 of the carving device 10, whereby the head 22, neck 59, breast 60, and portions of the wings 62 and legs 64 of the carcass 20 are inside the periphery of the mounting board 12. The carving device 10 is ultimately disposed in an inclined locked position, selected by the user, upon the counter surface or similar substantially horizontal surface. The user then proceeds to cut a line 66 upon or adjacent to the breast bone of the carcass 20, then proceeds to separate selected portions of the carcass 20 that will ultimately be cleaned and cooked. The preferred use for the carving device 10 is to enable the user to safely carve the breast portion 60 from the carcass 20 with less effort and in less time then would normally be required when carving the carcass 20 in a substantially horizontal position.

The foregoing description is for the purpose of illustration only and is not intended to limit the scope of protection accorded this invention. The scope of protection is to be measured by the following claims, which should be interpreted as broadly as the inventive contribution permits.

The invention claimed is:

1. An inclined carving device for a carcass comprising:
   a mounting board having a plurality of apertures distributed in said mounting board in a predetermined pattern;
   retaining pins removably inserted into apertures in said mounting board after a carcass is disposed upon said mounting board, whereby, a plurality of said retaining pins engage peripheral portions of the carcass sufficient to maintain the carcass upon said mounting board when disposed in an inclined relationship relative to the horizontal surface said device is disposed upon; and
   a positioning member secured to said mounting board for disposing said mounting board in an inclined relationship relative to a surface said carving device is disposed upon;
   whereby, said retaining pins are disposed in apertures that enable said retaining pins to engage peripheral portions of the carcass sufficient to maintain the carcass upon said mounting board disposed in the inclined position selected by the user, thereby enabling the user of said inclined carving device to safely and comfortably carve selected portions of the carcass in a minimum time period.

2. The device of claim 1 wherein said positioning member includes at least one stabilizing bar.

3. The device of claim 1 wherein said mounting board includes a surface area corresponding to the periphery of a carcass secured to the mounting board.

4. The device of claim 1 wherein said plurality of apertures are threaded.

5. The device of claim 1 wherein said retaining pins include threads for rotationally securing said pins to said mounting board.

6. The device of claim 1 wherein said retaining pins include a hook member for grasping portions of a carcass for retaining the carcass upon said mounting board.

7. The device of claim 6 wherein said hook member includes an angled end portion for securing the carcass to said mounting board.

8. The device of claim 7 wherein said angled end portion includes a pointed end for penetrating the carcass when grasping the carcass.

9. The device of claim 1 wherein each of said plurality of apertures includes a removable sleeve member.

10. The device of claim 1 wherein said retaining pins include a shank inserted through selected sleeve members.

11. The device of claim 10 wherein said retaining pins include a head portion that ultimately engage said sleeve members.

12. The device of claim 11 wherein said retaining pins include a threaded end for rotationally receiving nuts after said retaining pins are inserted through selected sleeves, thereby removably securing said retaining pins to said mounting board when said head portions engage said sleeve members.

13. The device of claim 1 wherein said positioning member is pivotally secured to said mounting board via retainer members, whereby end portions of said positioning member are manually urged into and extracted from said retainer members, thereby enabling said positioning member to be manually disposed in closed and open positions relative to said mounting board.

14. The device of claim 1 wherein said mounting board includes multiple hanging hooks for detachably supporting said mounting board in a substantially vertical position, irrespective of a carcass being secured to said mounting board.

15. A carving device for a carcass comprising:
- a mounting board having a plurality of apertures distributed in said mounting board in a predetermined matrix configuration;
- retaining pins removably inserted into selected apertures in said mounting board, whereby said retaining pins engage peripheral portions of a carcass sufficient to maintain the carcass upon said mounting board when disposed in an inclined relationship relative to a substantially horizontal surface said device is disposed upon; and
- a positioning member pivotally secured to said mounting board for disposing said mounting board and the carcass detachably secured to said mounting board at an inclined acute angle relative to the substantially horizontal surface said device is disposed upon, said positioning member including at least one stabilizing bar.

16. The device of claim 15 wherein said retaining pins are manually disposed in apertures that enable said retaining pins to engage portions of the carcass sufficient to secure the carcass to said mounting board when disposed in an inclined position selected by the user.

17. The device of claim 15 wherein said positioning member is pivotally secured to said mounting board via retainer members, whereby end portions of said positioning member are manually urged into and extracted from said retainer members, thereby enabling said positioning member to be manually disposed in closed and open positions relative to said mounting board.

18. A carving device for a carcass comprising:
- a mounting board having a plurality of apertures distributed in said mounting board in a predetermined matrix configuration;
- retaining pins removably inserted into selected apertures in said mounting board, said retaining pins detachably securing a carcass to said mounting board, said retaining pins being removably inserted though sleeves for separating head portions of said release pins from a top surface of said mounting board, thereby enabling said release pins to secure the carcass to said mounting board; and
- a positioning member pivotally secured to said mounting board for disposing said mounting board and the carcass detachably secured to said mounting board at an inclined acute angle relative to a substantially horizontal surface said device is disposed upon, said positioning member including at least one stabilizing bar.

19. A carving device for a carcass comprising:
- a mounting board having a plurality of apertures distributed in said mounting board in a predetermined matrix configuration;
- retaining pins removably inserted into selected apertures in said mounting board, said retaining pins detachably securing a carcass to said mounting board, said retaining pins including pins having threaded end portions for rotationally securing said retaining pins in selected apertures having cooperating threads for rotationally receiving said threaded end portions of said retaining pins, thereby enabling head portions of said retaining pins to be separated from and elevated above a top surface of said mounting board, said retaining pins ultimately securing a carcass upon said top surface of said mounting board; and
- a positioning member pivotally secured to said mounting board for disposing said mounting board and the carcass detachably secured to said mounting board at an inclined acute angle relative to a substantially horizontal surface said device is disposed upon, said positioning member including at least one stabilizing bar.

20. A carving device comprising:
- a mounting board having a plurality of threaded apertures distributed in said mounting board;
- threaded retaining pins rotationally secured in selected threaded apertures;
- hook members detachably secured to said threaded retaining pins, said hook members ultimately grasping and securing an object to said mounting board; and
- a positioning member pivotally secured to said mounting board, said positioning member including at least one stabilizing bar, said positioning member being manually urged to an open position that correspondingly disposes said mounting board in an inclined position selected by a user for promoting the carving of an object removably secured to said mounting board, said at least one stabilizing bar maintaining the user selected inclined position of said mounting board irrespective of the manual force imparted upon said mounting board when the user carves the object disposed upon and removably secured to said mounting board.

* * * * *